Figure 1:
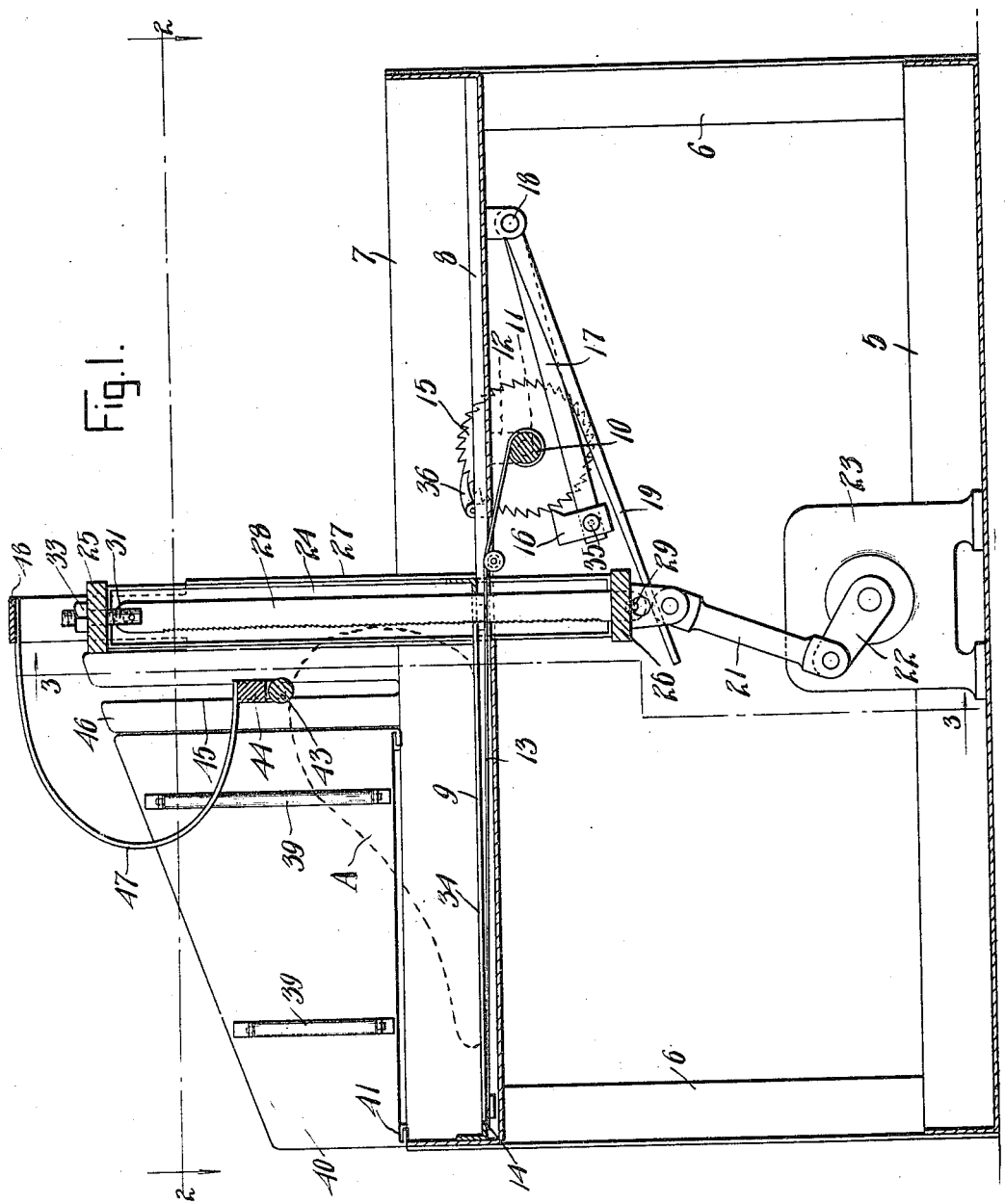

A. DE KLERIS.
MEAT CUTTING MACHINE.
APPLICATION FILED MAR. 11, 1918.

1,272,233.

Patented July 9, 1918.
3 SHEETS—SHEET 1.

Inventor
Andreas De Kleris
By Radford & Doolittle,
Attorneys

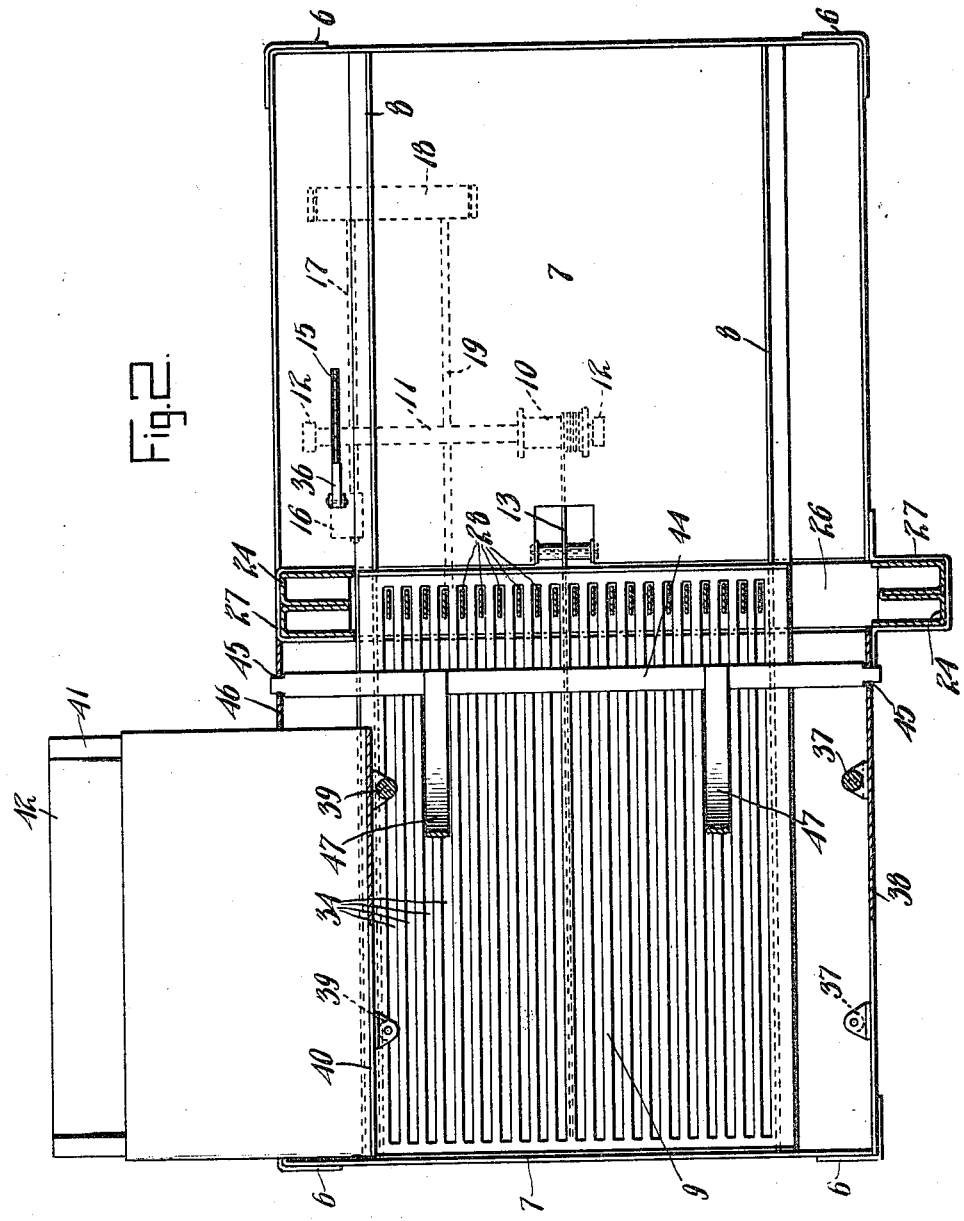

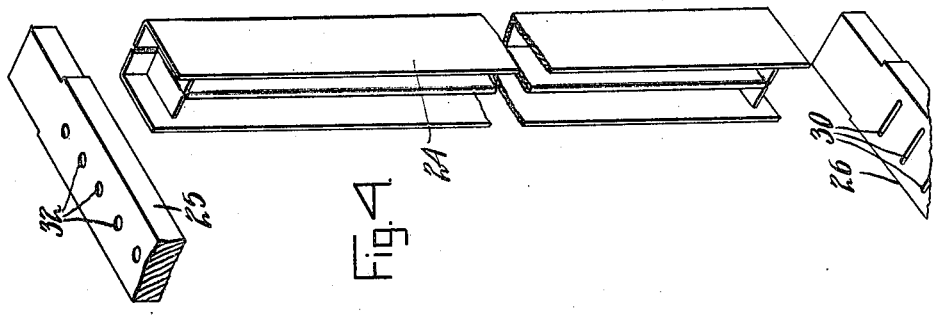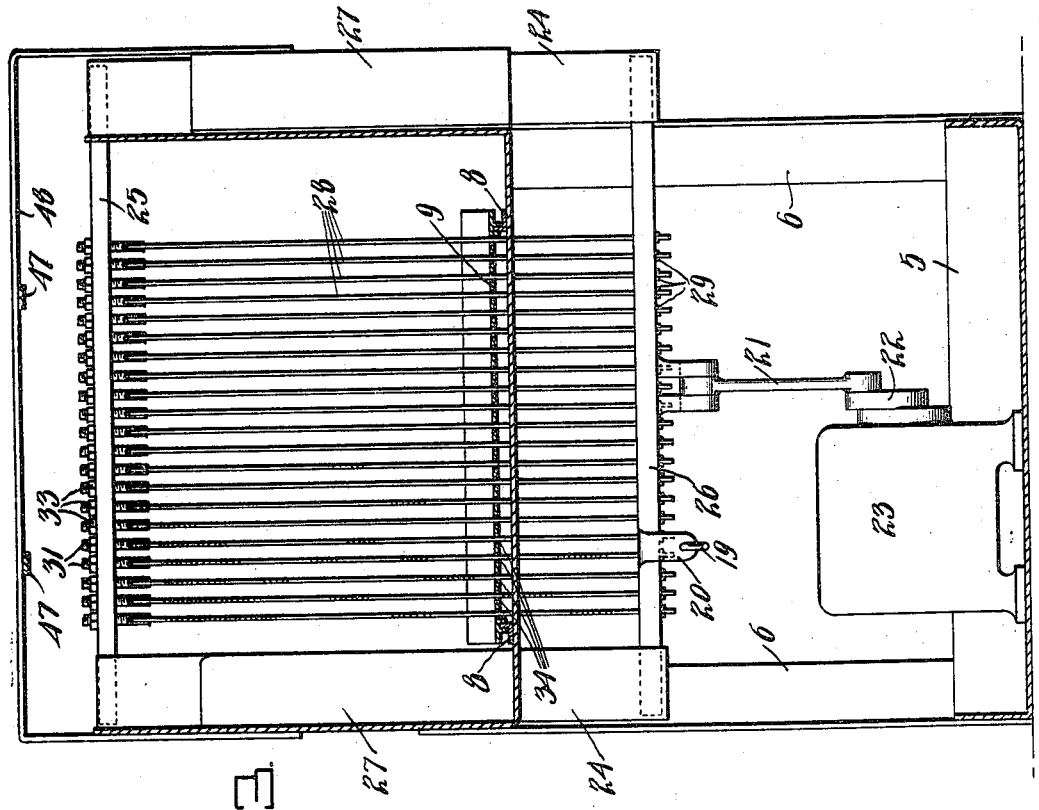

UNITED STATES PATENT OFFICE.

ANDREAS DE KLERIS, OF VISALIA, CALIFORNIA.

MEAT-CUTTING MACHINE.

1,272,233.     Specification of Letters Patent.     Patented July 9, 1918.

Application filed March 11, 1918. Serial No. 221,709.

*To all whom it may concern:*

Be it known that I, ANDREAS DE KLERIS, a citizen of the United States, residing at Visalia, Tulare county, and State of California, have invented and discovered certain new and useful Improvements in Meat-Cutting Machines, of which the following is a specification.

My said invention relates to machines for cutting meat and similar substances and consists in the combinations and arrangements of elements hereinafter described and particularly set forth in the accompanying claims.

The primary purpose of the invention is to produce a machine for cutting meat in carcass, or quarters, or other large parts in one continuous operation, and wherein the machine is simple in construction and manner of operation and will not require any particular skill to be worked.

A further purpose of the invention resides in providing a cutting machine with a plurality of knives or saws arranged in such a manner that the material may be cut in uniform sections of pre-determined size, or in non-uniform sections of pre-determined size, as preferred.

The invention is shown by way of illustration in the accompanying drawings wherein:

Figure 1 is a longitudinal section view of the machine;

Fig. 2, a top plan view, partly in section, taken on the line 2—2 of Fig. 1;

Fig. 3, a transverse sectional view taken on the line 3—3 of Fig. 1, and

Fig. 4, a detail view of a part of the saw carrying frame.

Referring to the construction in further detail and wherein like reference characters designate corresponding parts in the different figures the apparatus consists of a suitable supporting structure comprising a base portion 5, corner posts 6, and a top portion 7. A pair of tracks or guides 8 are mounted in the frame portion 7, and a carriage 9 in the form of a tray is adapted to reciprocate on said tracks and carry the piece of meat A, or other material, to be cut.

The carriage operating means consists of a reel 10 mounted on the shaft 11 that is suitably journaled in brackets 12 mounted on the supporting structure, and a cord or chain 13 wound on the reel is connected to the rear end 14 of the carriage 9 as shown (see Fig. 1).

A ratchet wheel 15 fixed on the shaft 11 is engaged and operated by a pawl 16 mounted on an arm 17 that is secured to a shaft 18 suitably journaled in the frame (see Fig. 2). A second arm 19 secured to said shaft 18 is engaged by the cross head 20 of the cutter supporting frame, and said cross head is operated through the connecting rod 21 that engages with the crank arm 22 of the motor 23 as shown. The motor 23 is preferably an electric motor but it will be understood, of course, that any other type of motor or power source may be employed.

The means for cutting the material consists of a vertically reciprocable frame comprising a pair of side members 24 constructed preferably of angle sheet metal, and connected by a pair of cross bars 25 and 26 that engage respectively with the upper and lower ends of the side members 24 as shown. This rectangular frame (*i. e.*, 24, 25 and 26) is mounted to vertically operate in the pair of guides 27, that are preferably in the form of channel pieces and are secured to the sides of the frame supporting structure.

A plurality of vertically disposed band saws 28 are carried by said movable frame, and each saw is fastened to the frame member 26 by a pin 29 and the member 26 is formed with slots 30 to receive the saws. The upper end of each saw is secured to a bolt 31 passing through an aperture 32 in the cross bar 25, and the several bolts 31 are screw threaded whereby the tension on the saws or cutters may be regulated by the adjusting nuts 33 screw-threaded on the bolts (see Fig. 1). The adjustable feature for the several saws also serves as a means for securing the desired rigidity of the saw carrying frame as will be evident.

The several saws or cutters 28 are mounted to operate through the several parallel slots 34 that are formed in the bottom of the tray or carriage 9, and thus the several saws while reciprocating will cut through the piece of meat or other material A as the carriage is advanced in a step by step movement along the supporting structure. It will be noted that this intermittent motion of the carriage is effected on each returning or non-cutting stroke of the saws.

The pawl 16 engaging the racket wheel 15 is mounted on the pin or bolt 35 to have angular adjustment with respect to the teeth of the pawl to the end that said pawl will turn the ratchet wheel for a greater or lesser distance according to the angle at which the pawl is set. An ordinary detent pawl 36 engages the ratchet wheel 15 for the usual purpose.

In operation the piece of meat A or other material, is placed on the carriage 9 in accordance with the manner in which it is to be cut and is then held steady in position by means of a pair of rollers 37 that are mounted on the side piece 38 of the supporting structure, and a second pair of rollers 39 are provided to engage the opposite side of the piece. The rollers 39 are mounted on a side piece 40 that is slidably supported on the guide ways 41 of an extended portion 42 of the supporting structure.

A detent roller 43 engages the piece A at the top and said roller is journaled on a cross bar 44 that has vertical sliding movement in the pair of slots 45 formed in the upright side pieces 46 on said structure. The roller 43 is caused to be held in contact with the piece A while the carriage works by a pair of bow springs 47 whose fixed ends are secured to a cross bar 48 as shown. By this means meat, or any other material difficult to cut up in parts of regular size and shape, may be quickly and easily divided into slices or parts of the size desired and the bones or other obstructions therein do not interfere to prevent such result, as with other forms of cutters.

It is obvious that those skilled in the art may vary the details of construction and arrangement of parts without departing from the spirit of my invention and I therefore do not wish to be limited to such features except as may be required by the claims.

Having thus fully described my said invention what I claim as new and desire to secure by Letters Patent is:

1. In an apparatus of the character described the combination of a supporting structure, a carriage having a plurality of slots mounted to reciprocate in said structure, a pair of vertically disposed guideways mounted on the structure, a frame reciprocable in said guide-ways, a plurality of cutter blades carried by said frame and passing through the slots in the supporting structure, a motor, a driving connection between the motor and the cutter carrying frame, and a driving connection between said cutter carrying frame and the reciprocable carriage, substantially as set forth.

2. In an apparatus of the character described the combination of a supporting structure, a carriage having a plurality of slots mounted to reciprocate in said structure, a pair of vertically disposed guideways mounted on the structure, a frame reciprocable in said guide-ways, a plurality of cutter blades carried by said frame and passing through the slots in the supporting structure, a motor, a driving connection between the motor and the cutter carrying frame, a reel, a rope on the reel connected to the reciprocable carriage, and a pawl and ratchet driving connection between said cutter carrying frame and the reel, substantially as set forth.

3. In an apparatus of the character described the combination of a supporting structure, tracks mounted on said structure, a carriage having a plurality of slots mounted to travel on said tracks, vertically disposed channel pieces, forming guide-ways at the sides of the supporting structure, a frame reciprocable in said guide-ways, a plurality of cutter blades carried by said frame and passing through the slots in the supporting structure, a motor, a crank and connecting rod drive between said motor and the cutter carrying frame, and a pawl and ratchet driving connection between the cutter carrying frame and the reciprocable carriage, substantially as set forth.

4. In an apparatus of the character described the combination of a supporting structure, tracks mounted on said structure, a carriage having a plurality of slots mounted to travel on said tracks, vertically disposed channel pieces, forming guide-ways at the sides of the supporting structure, a frame reciprocable in said guide-ways, a plurality of strip saws independently mounted in said frame and passing through the slots in the supporting structure, a motor mounted on said structure directly beneath the saw carrying frame, a crank and connecting rod drive between said motor and the cutter carrying frame, and a pawl and ratchet driving connection between the said cutter carrying frame and the reciprocable carriage, substantially as set forth.

5. In an apparatus of the character described the combination of a supporting structure, a reciprocable carriage mounted in said structure, a plurality of cutting knives, means for operating said knives, operative connections between the carriage and the knife operating means, fixed and movable rollers for guiding the piece to be cut, and a spring tensioned detent roller for steadying the moving piece, substantially as set forth.

In witness whereof, I have hereunto set my hand and seal at Washington, District of Columbia, this ninth day of March, A. D. nineten hundred and eighteen.

ANDREAS DE KLERIS. [L. S.]

Witnesses:
E. W. BRADFORD,
JAMES SHENOS.